(12) United States Patent
Kasai

(10) Patent No.: US 7,935,742 B2
(45) Date of Patent: May 3, 2011

(54) INK COMPOSITION, INKJET RECORDING METHOD, PROCESS FOR PRODUCING LITHOGRAPHIC PRINTING PLATE, AND LITHOGRAPHIC PRINTING PLATE

(75) Inventor: Seishi Kasai, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 870 days.

(21) Appl. No.: 11/704,943

(22) Filed: Feb. 12, 2007

(65) Prior Publication Data

US 2007/0206053 A1  Sep. 6, 2007

(30) Foreign Application Priority Data

Mar. 3, 2006 (JP) .................... 2006-057891

(51) Int. Cl.
*C08F 2/50* (2006.01)
*C08J 3/28* (2006.01)
*C09D 11/08* (2006.01)
*C09D 11/00* (2006.01)
*G03C 1/00* (2006.01)

(52) U.S. Cl. .............. 522/181; 522/66; 522/63; 522/65; 522/71; 522/74; 522/81; 522/173; 522/178; 522/182; 522/909; 430/286.1; 430/288.1; 523/300; 523/160; 252/600; 106/31.13; 106/31.6

(58) Field of Classification Search ............ 522/63, 522/65, 66, 116, 120, 136, 141, 168, 173, 522/178, 181, 182, 71, 74, 81, 184, 909; 430/286.1, 288.1; 106/31.13, 31.6; 523/300, 523/160; 252/600

See application file for complete search history.

(56) References Cited

U.S. PATENT DOCUMENTS

| 6,326,419 B1 * | 12/2001 | Smith | 523/160 |
| 6,476,092 B1 * | 11/2002 | Kunita | 522/31 |
| 7,015,257 B2 * | 3/2006 | Hayashi | 522/181 |
| 7,368,485 B2 * | 5/2008 | Noutary | 522/39 |
| 2006/0019077 A1 * | 1/2006 | Hopper et al. | 428/209 |

FOREIGN PATENT DOCUMENTS

| EP | 1 426 421 A1 | 6/2004 |
| EP | 1 721 945 A1 | 11/2006 |
| EP | 1721945 A1 * | 11/2006 |
| GB | 2 311 787 A | 10/1997 |
| GB | 2 314 851 A | 1/1998 |
| GB | 2 371 551 A | 7/2002 |
| JP | 5-214280 A | 8/1993 |

OTHER PUBLICATIONS

European Search Report dated Jun. 26, 2007.

* cited by examiner

*Primary Examiner* — Sanza L McClendon
(74) *Attorney, Agent, or Firm* — Sughrue Mion, PLLC

(57) ABSTRACT

An ink composition is provided that includes (A) one type of compound (monomer (A)) selected from the group consisting of a difunctional (meth)acrylic acid ester or amide having an alkylene group of 6 to 12 carbons, and a difunctional vinyl ether having an alkylene group of 6 to 12 carbons, (B) a polymerization initiator, and (C) a colorant. There is also provided an inkjet recording method that includes a step (a) of discharging the ink composition onto a recording medium and a step (b) of irradiating the discharged ink composition with actinic radiation so as to cure the ink composition. Furthermore, a process for producing a lithographic printing plate is provided that includes a step (a') of discharging the ink composition onto a hydrophilic support and a step (b') of irradiating the discharged ink composition with actinic radiation so as to cure the ink composition, thus forming a hydrophobic image on the hydrophilic support by curing the ink composition. A lithographic printing plate produced by the process for producing a lithographic printing plate is also provided.

20 Claims, No Drawings

INK COMPOSITION, INKJET RECORDING METHOD, PROCESS FOR PRODUCING LITHOGRAPHIC PRINTING PLATE, AND LITHOGRAPHIC PRINTING PLATE

BACKGROUND OF THE INVENTION

1. Field of the Invention

The present invention relates to an ink composition suitably used for inkjet recording, an inkjet recording method and, furthermore, a lithographic printing plate obtained by employing the ink composition and a process for producing a lithographic printing plate. More particularly, it relates to an ink composition suitable for inkjet recording that cures with high sensitivity upon exposure to actinic radiation, and gives a cured material having sufficient flexibility even after the ink composition has been cured; an inkjet recording method; and a lithographic printing plate obtained by employing the ink composition and a process for producing a lithographic printing plate.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the equipment is inexpensive and, since an image is formed directly on a recording medium by discharging an ink composition only on a required image area, the ink composition can be used efficiently and the running cost is low. Furthermore, there is little noise and it is excellent as an image recording system.

With regard to an ink composition that can be cured by irradiation with actinic radiation such as ultraviolet rays (radiation curing type ink composition), as an ink composition for inkjet recording, for example, there is a desire for one that cures with high sensitivity and forms an image with high image quality. By achieving higher sensitivity, high curability upon exposure to actinic radiation can be imparted, and there are therefore provided various benefits such as a reduction in power consumption, longer lifetime of an actinic radiation generator due to a decrease in the load thereon and, as a result of adequate curing being achieved, suppression of evaporation of uncured low molecular weight material and of a reduction in the strength of an image formed. Furthermore, improvement in the image strength due to higher sensitivity imparts high plate life to an image when the ink composition is used for the formation of an image of a lithographic printing plate.

With regard to a UV curing type ink composition, for example, an ink composition employing in combination a plurality of monomers having different levels of functional groups has been proposed (ref. e.g. JP-A-5-214280; JP-A denotes a Japanese unexamined patent application publication). However, in such an ink composition, in order to maintain the curing speed, it is necessary to use a large amount of polyfunctional monomer, and in this case an image obtained after curing the ink composition has a problem with flexibility.

Conventionally, when a lithographic printing plate is produced, a so-called PS plate having a constitution in which a lipophilic photosensitive resin layer is provided on a hydrophilic support is used; this photosensitive resin layer is imagewise exposed to light to thus improve or degrade the solubility of the exposed area toward an alkaline developer and form an image, and the non-image area is then dissolved and removed. However, in recent years, a digitization technique of electronically processing, storing, and outputting image information using a computer has become widespread, and a new image output method that matches the above technique has been desired. In particular, a method that can produce a printing plate without a treatment employing a developer has been examined, and a process for directly producing a lithographic printing plate using an inkjet recording ink composition has been investigated. In this process, an ink composition is discharged imagewise on the surface of a preferably hydrophilic support by an inkjet method, etc., and this is then cured by irradiation with actinic radiation, thereby giving a printing plate having a desired image (preferably a hydrophobic image). In order to form an image area of a lithographic printing plate, it is desirable that ink composition droplets discharged onto a support cure quickly without spreading, the cured image area has excellent strength and adhesion to the support, and the image area follows flexure of the support well when the lithographic printing plate is set in a printer to thus prevent any occurrence of damage such as cracking, and there is currently a desire for an ink composition that is suitable for such an application.

BRIEF SUMMARY OF THE INVENTION

It is an object of the present invention to provide an ink composition that has excellent adhesion to a recording medium in an image obtained by curing the ink composition, and an inkjet recording method employing the ink composition.

It is another object of the present invention to provide a lithographic printing plate obtained by using an ink composition that has excellent adhesion to a recording medium in an image obtained by curing the ink composition, and a process for producing a lithographic printing plate.

As a result of an intensive investigation by the present inventors, it has been found that use of a specific polymerizable compound in an ink composition can give an ink composition having improved flexibility after curing the ink composition while maintaining high sensitivity and having enhanced adhesion to a recording medium, and the objects of the present invention have been accomplished by (1), or (3) to (5) below. (2), which is a preferred embodiment, is also shown below.

(1) An ink composition comprising (A) at least one type of polymerizable compound selected from the group consisting of a difunctional (meth)acrylic acid ester or amide having an alkylene group of 6 to 12 carbons, and a difunctional vinyl ether having an alkylene group of 6 to 12 carbons, (B) a polymerization initiator, and (C) a colorant, (2) the ink composition according to (1) above, wherein it is for inkjet recording, (3) an inkjet recording method comprising a step (a) of discharging the ink composition according to (1) or (2) above onto a recording medium and a step (b) of irradiating the discharged ink composition with actinic radiation so as to cure the ink composition, (4) a process for producing a lithographic printing plate, the process comprising a step (a') of discharging the ink composition according to (1) or (2) above onto a hydrophilic support and a step (b') of irradiating the discharged ink composition with actinic radiation so as to cure the ink composition, thus forming a hydrophobic image on the hydrophilic support by curing the ink composition, and (5) a lithographic printing plate produced by the process for producing a lithographic printing plate according to (4) above.

DETAILED DESCRIPTION OF THE INVENTION

Ink Composition

The ink composition of the present invention can be cured by heat or irradiation with actinic radiation, and comprises (A) one type of compound selected from the group consisting of a difunctional (meth)acrylic acid ester or amide having an alkylene group of 6 to 12 carbons, and a difunctional vinyl ether having an alkylene group of 6 to 12 carbons, (B) a polymerization initiator, and (C) a colorant.

The ink composition of the present invention may suitably be used for inkjet recording.

The 'actinic radiation' referred to in the present invention is not particularly limited as long as it can provide energy that enables an initiating species to be generated in the ink composition when irradiated, and broadly includes α rays, γ rays, X rays, ultraviolet rays, visible light, and an electron beam. Among these, ultraviolet rays and an electron beam are preferable from the viewpoint of curing sensitivity and the availability of equipment, and ultraviolet rays are particularly preferable. The ink composition of the present invention is therefore preferably a curable ink composition that can be cured by irradiation with ultraviolet rays as actinic radiation.

(A) One Type of Compound Selected from the Group Consisting of a Difunctional (Meth)Acrylic Acid Ester or Amide Having an Alkylene Group of 6 to 12 Carbons, and a Difunctional Vinyl Ether Having an Alkylene Group of 6 to 12 Carbons The ink composition of the present invention comprises (A) one type of compound selected from the group consisting of a difunctional (meth)acrylic acid ester or amide having an alkylene group of 6 to 12 carbons, and a difunctional vinyl ether having an alkylene group of 6 to 12 carbons (hereinafter, called as appropriate 'monomer (A)', 'component (A)', or a 'specific polymerizable compound'). It is preferable for the ink composition of the present invention to comprise a component (A) since adhesion to a recording medium is improved.

Use of the component (A) enables the overall surface energy of the ink composition to be brought close to that of the recording medium, and since the alkylene moiety of component (A) is aligned with the surface of the recording medium, effective adhesion at the interface of the recording medium becomes possible and it becomes possible to impart adhesion to a recording medium that generally has a low surface energy and to which it is difficult to impart adhesion.

The component (A) is explained below.

As the component (A) in the present invention, an ester of (meth)acrylic acid and a diol having an alkylene group of 6 to 12 carbons, an amide of (meth)acrylic acid and a diamine having an alkylene group of 6 to 12 carbons, or a vinyl ether of a diol having an alkylene group of 6 to 12 carbons may be suitably used.

The '(meth)acrylic acid' referred to in the present invention is an abbreviation denoting both acrylic acid and methacrylic acid.

The alkylene group of component (A) means the entire alkylene group directly bonded to the oxygen atom of an ester bond, the nitrogen atom of an amide bond, or the oxygen atom of a vinyl ether bond. That is, when there are a plurality of said alkylene groups, all of said plurality of alkylene groups correspond to the alkylene group of component (A), and it is necessary for the total number of carbons contained in such alkylene groups to be 6 to 12. For example, when the component (A) is an amide in which two alkylalkylene groups are directly bonded to nitrogen atoms of two amide bonds, it is necessary for the total number of carbons contained in said two alkylene groups to be 6 to 12.

The component (A) that can be used in the present invention preferably has said alkylene group directly bonded to two (meth)acrylic acid esters or amides, or to two vinyl ethers.

Furthermore, the vinyl groups of a difunctional vinyl ether having an alkylene group of 6 to 12 carbons may be unsubstituted vinyl groups or mono- to tri-substituted vinyl groups, and are preferably unsubstituted vinyl groups from the viewpoint of reactivity, etc.

Examples of the diol having an alkylene group of 6 to 12 carbons include diols having a straight chain alkylene group such as 1,6-hexanediol, 1,7-heptanediol, 1,8-octanediol, 1,9-nonanediol, 1,10-decanediol, 1,11-undecanediol, and 1,12-dodecanediol, and diols having a branched alkylene group such as 2-ethylhexane-1,6-diol and 2-methylheptane-1,7-diol.

Examples of the diamine having an alkylene group of 6 to 12 carbons include primary diamines having a straight chain alkylene group such as 1,6-hexanediamine, 1,7-heptanediamine, 1,8-octanediamine, 1,9-nonanediamine, 1,10-decanediamine, 1,11-undecanediamine, and 1,12-dodecanediamine, primary diamines having a branched alkylene group such as 2-ethylhexane-1,6-diamine and 2,2-dimethylhexane-1,6-diamine, and secondary diamines in which one group such as a methyl group, an ethyl group, a propyl group, an isopropyl group, a butyl group, or a hexyl group has been introduced into each of the two amino groups of the above-mentioned primary diamine.

The alkylene group is an alkylene group of 6 to 12 carbons and is preferably a straight chain alkylene group from the viewpoint of influence on the flexibility after curing. The number of carbons of the alkylene group is preferably 8 to 12, and particularly preferably 8 to 10.

When the number of carbons of the alkylene group is less than 6, there is the problem that it becomes impossible for sufficient flexibility to be exhibited after curing. Furthermore, if the number of carbons of the alkylene group exceeds 12, the compatibility with the composition degrades, thus causing a deterioration in the stability of the composition or a deterioration in the flexibility after curing.

Preferred specific examples of component (A) that can be used in the present invention include 1,6-hexane diacrylate (1,6-hexanediol diacrylate), 1,7-heptane diacrylate, 1,8-octane diacrylate, 1,9-nonane diacrylate, 1,10-decane diacrylate, 1,11-undecane diacrylate, 1,12-dodecane diacrylate, 1,6-hexane dimethacrylate, 1,7-heptane dimethacrylate, 1,8-octane dimethacrylate, 1,9-nonane dimethacrylate, 1,10-decane dimethacrylate, 1,11-undecane dimethacrylate, 1,12-dodecane dimethacrylate, 1,6-hexane diacrylamide, 1,7-heptane diacrylamide, 1,8-octane diacrylamide, 1,9-nonane diacrylamide, 1,10-decane diacrylamide, 1,11-undecane diacrylamide, 1,12-dodecane diacrylamide, 1,6-hexane divinyl ether, 1,7-heptane divinyl ether, 1,8-octane divinyl ether, 1,9-nonane divinyl ether, 1,10-decane divinyl ether, 1,11-undecane divinyl ether, 1,12-dodecane divinyl ether, 1,6-(2-ethylhexane)diacrylate, 1,6-(2-ethylhexane)dimethacrylate, 1,6-(2-ethylhexane)diacrylamide, and 1,6-(2-ethylhexane) divinyl ether, but the present invention is not limited thereby.

The component (A) may be used singly or two or more types thereof may be used; a mode in which two or three types thereof are mixed and used in combination is preferable, and a mode in which two or three types of difunctional (meth) acrylic acid esters having an alkyl group of 8 to 10 carbons are used in combination is particularly preferable.

The content of component (A) in the ink composition of the present invention is preferably in the range of 1 to 90 wt % relative to the weight of the entire ink composition from the viewpoint of the effect of improving adhesion and the suitability for inkjet of the ink composition, more preferably in the range of 5 to 60 wt %, and particularly preferably 8 to 50 wt %.

(B) Polymerization Initiator

The ink composition of the present invention comprises a polymerization initiator. As the polymerization initiator, a known polymerization initiator may be used. In the present invention, it is preferable to use a radical polymerization initiator.

The polymerization initiator that is used in the ink composition of the present invention is a compound that forms a polymerization initiating species by absorbing external energy. The external energy used for initiating polymerization can be broadly divided into heat and actinic radiation, and a thermal polymerization initiator and a photopolymerization initiator are used respectively. Examples of the radiation include γ rays, β rays, an electron beam, ultraviolet rays, visible light, and infrared rays.

As the thermal polymerization initiator and the photopolymerization initiator, known compounds may be used.

Examples of the radical polymerization initiator that can be used in the present invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

The radical polymerization initiator of the present invention may be used singly or in a combination of two or more types.

The polymerization initiator (B) in the present invention is preferably contained in the range of 0.01 to 35 wt % relative to the total amount of component (A) or relative to the total amount of polymerizable compounds when component (A) and another polymerizable compound (D), which is an optional component, are used in combination, more preferably 0.1 to 30 wt %, and yet more preferably 0.5 to 30 wt %.

The polymerization initiator (B) is preferably contained, relative to a sensitizer (E), which is used as necessary and will be described later, in a polymerization initiator:sensitizer ratio by weight range of 200:1 to 1:200, more preferably 50:1 to 1:50, and yet more preferably 20:1 to 1:5.

(C) Colorant

The ink composition of the present invention comprises (C) a colorant.

The colorant that can be used in the present invention is not particularly limited, but a pigment (C-1) and an oil-soluble dye (C-2) that have excellent weather resistance and rich color reproduction are preferable, and the colorant may be selected from any known colorant such as a soluble dye. With regard to the colorant that can be suitably used in the ink composition of the present invention, from the viewpoint of not degrading the sensitivity of a curing reaction by actinic radiation, it is preferable to select a compound that does not function as a polymerization inhibitor in a polymerization reaction, which is a curing reaction.

(C-1) Pigment

The pigment that can be used in the present invention is not particularly limited and, for example, organic and inorganic pigments having the numbers below described in the Color Index may be used.

As a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

(C-2) Oil-Soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other types of dye such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit the respective colors of yellow, magenta, and cyan only after a part of the chromophore (chromogenic atomic group) dissociates, and in that case a counter cation may be an inorganic cation such as an alkali metal or ammonium, may be an organic cation such as pyridinium or a quaternary ammonium salt, or may be a polymer cation having the above cations as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

When an oil-soluble dye is used as the colorant, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples thereof include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The colorant that can be used in the present invention is preferably added to the ink composition of the present invention and then dispersed in the ink composition to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

When carrying out dispersion of the colorant, a dispersant may be added. The type of dispersant is not particularly limited, but it is preferable to use a polymeric dispersant, and examples of the polymeric dispersant include the Solsperse series manufactured by Zeneca. Furthermore, as a dispersion adjuvant, it is also possible to use a synergist, depending on the various types of colorant. In the present invention, the dispersant and dispersion adjuvant are preferably added at 1 to 50 parts by weight relative to 100 parts by weight of the colorant.

The colorant may be added directly together with other components when preparing the ink composition of the present invention, but in order to improve dispersibility it may be added in advance to a solvent, the component (A) used in the present invention, or a dispersion medium such as the other polymerizable compound (D) used in combination as desired, thus giving a uniform dispersion or solution.

In the present invention, in order to avoid the problems of the solvent resistance being degraded when solvent remains in the cured image and residual solvent VOC (Volatile Organic Compound), it is preferable to add the colorant in advance to any one of the polymerizable compounds, such as component (A), or a mixture thereof. When considering only the viewpoint of dispersion suitability, it is preferable to select the monomer having the lowest viscosity as the polymerizable compound used for addition of the colorant.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersion medium, dispersion conditions, and filtration conditions to be set so that the average particle size of colorant particles is preferably 0.005 to 0.5 $\mu$m, more preferably 0.01 to 0.45 $\mu$m, and yet more preferably 0.015 to 0.4 $\mu$m. By such control of particle size, clogging of a head nozzle can be suppressed, and the storage stability of the ink composition, the transparency of the ink composition, and the curing sensitivity can be maintained.

The content of the colorant in the ink composition of the present invention is appropriately selected according to the intended purpose, and while taking into consideration the coloring properties it is generally preferably 1 to 10 wt % relative to the weight of the entire ink composition, and more preferably 2 to 8 wt %.

The ink composition of the present invention may use another component in combination with the above-mentioned essential components for the purpose of improving physical properties as long as the effects of the present invention are not impaired.

These optional components are explained below.

(D) Other Polymerizable Compound

The ink composition of the present invention preferably comprises (D) another polymerizable compound in addition to the component (A). Examples of the other polymerizable compound that can be used in combination in the present invention include a radically polymerizable compound and a cationically polymerizable compound.

The other polymerizable compound (D) may be used by appropriately selecting it according to various intended properties or in relation to the polymerization initiator (B).

In the present invention, the total content of the polymerizable compounds, that is, the total amount added of component (A) and the other polymerizable compound (D) that can be used in combination therewith, is 6 to 55 wt % of the weight of the entire ink composition of the present invention, and more preferably 10 to 45 wt %.

Furthermore, in the ink composition of the present invention, the component (A) is preferably contained at 10 wt % or greater relative to the total polymerizable compound content contained in the ink composition (that is, the total content of the component (A) and the component (D)), more preferably 15 wt % or greater, yet more preferably 20 wt % or greater, and particularly preferably 30 wt % or greater.

The radically polymerizable compound in the present invention is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used in combination at any ratio in order to improve an intended property. It is more preferable to use two or more types in combination in terms of controlling aspects of performance such as reactivity or physical properties.

Examples of the polymerizable compound having a radically polymerizable ethylenically unsaturated bond include unsaturated carboxylic acids such as acrylic acid, methacrylic acid, itaconic acid, crotonic acid, isocrotonic acid, and maleic acid, and salts thereof, anhydrides having an ethylenically unsaturated group, acrylonitrile, styrene, and various types of radically polymerizable compounds such as unsaturated polyesters, unsaturated polyethers, unsaturated polyamides, and unsaturated urethanes.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxy-polyethoxyphenyl)propane, neopentylglycol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, an oligoester acrylate, N-methylolacrylamide, diacetoneacrylamide, and an epoxyacrylate; methacrylic derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxypolyethoxyphenyl)propane; and allyl compound derivatives such as allyl glycidyl ether, diallyl phthalate, and triallyl trimellitate. More specifically, commercial products, radically polymerizable or crosslinking monomers, oligomers, and polymers known in the art such as those described in 'Kakyozai Handobukku' (Crosslinking Agent Handbook); Ed. S. Yamashita (Taiseisha, 1981); 'UV-EB Koka Handobukku (Genryohen)' (UV-EB Curing Handbook (Starting Materials), Ed. K. Kato (Kobunshi Kankoukai, 1985); 'UV-EB Koka Gijutsu no Oyo to Shijyo' (Application and Market of UV-EB Curing Technology), p. 79, Ed. Rad Tech (CMC, 1989); and E. Takiyama 'Poriesuteru Jushi Handobukku' (Polyester Resin Handbook), (The Nikkan Kogyo Shimbun Ltd., 1988) can be used.

As the radically polymerizable compound, there are known, for example, photocuring type polymerizable compound materials used in photopolymerizable compositions described in publications such as JP-A-7-159983, JP-B-7-31399 (JP-B denotes a Japanese examined patent application publication), JP-A-8-224982, JP-A-10-863, and JP-A-9-134011, and they may be applied to the ink composition of the present invention.

It is also preferable to use a vinyl ether compound as the radically polymerizable compound. Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, octadecyl vinyl ether, ethylene glycol monovinyl ether, triethylene glycol monovinyl ether, hydroxyethyl monovinyl ether, and hydroxynonyl monovinyl ether.

Among these vinyl ether compounds, from the viewpoint of curability, adhesion, and surface hardness, a divinyl ether compound and a trivinyl ether compound are preferable, and a divinyl ether compound is particularly preferable. The vinyl ether compounds may be used singly or in a combination of two or more types as appropriate.

As the other polymerizable compound in the present invention, a (meth)acrylic acid ester (hereinafter, called an acrylate compound as appropriate), excluding the above-mentioned component (A), such as a (meth)acrylic monomer or prepolymer, an epoxy-based monomer or prepolymer, or a urethane-based monomer or prepolymer is preferably used. More preferred are the compounds below.

That is, 2-ethylhexyldiglycol acrylate, 2-hydroxy-3-phenoxypropyl acrylate, 2-hydroxybutyl acrylate, hydroxypivalic acid neopentyl glycol diacrylate, 2-acryloyloxyethylphthalic acid, methoxypolyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, nonylphenol ethylene oxide (EO) adduct acrylate, modified glycerol triacrylate, bisphenol A diglycidyl ether acrylic acid adduct, modified bisphenol A diacrylate, phenoxypolyethylene glycol acrylate, 2-acryloyloxyethylhexahydrophthalic acid, bisphenol A propylene oxide (PO) adduct diacrylate, bisphenol A EO adduct diacrylate, dipentaerythritol hexaacrylate, pentaerythritol triacrylate tolylenediisocyanate urethane prepolymer, lactone-modified flexible acrylate, butoxyethyl acrylate, propylene glycol diglycidyl ether acrylic acid adduct, pentaerythritol triacrylate hexamethylene diisocyanate urethane prepolymer, 2-hydroxyethyl acrylate, methoxydipropylene glycol acrylate, ditrimethylol propane tetraacrylate, pentaerythritol triacrylate hexamethylene diisocyanate urethane prepolymer, stearyl acrylate, isoamyl acrylate, isomyristyl acrylate, isostearyl acrylate, lactone-modified acrylate, etc. can be cited.

These acrylate compounds can reduce the viscosity compared with a polymerizable compound conventionally used in a UV-curing type ink composition and give stable ink composition dischargeability and good polymerization sensitivity and adhesion to a recording medium.

The monomers listed here have a low molecular weight, high reactivity, low viscosity, and excellent adhesion to a recording medium.

In order to further improve the sensitivity, spreading, and adhesion to a recording medium, it is preferable to use a monoacrylate in combination with a polyfunctional acrylate monomer or polyfunctional acrylate oligomer having a molecular weight of 400 or greater, and preferably 500 or greater.

In particular, in an ink composition that is used in recording onto a pliable recording medium such as a PET film or a PP film, it is preferable to use a monoacrylate selected from the above-mentioned compound group in combination with a polyfunctional acrylate monomer or polyfunctional acrylate oligomer since the film strength can be enhanced while imparting flexibility to the film and improving the adhesion.

Furthermore, a mode in which at least three types of polymerizable compounds, that is, monofunctional, difunctional, and tri- or higher-functional polyfunctional monomers, is cited as a preferred mode since the sensitivity, spreading, and adhesion to a recording medium can be further improved while maintaining the safety.

As the monoacrylate, stearyl acrylate, isoamyl acrylate, isomyristyl acrylate, and isostearyl acrylate are preferable since the sensitivity is high, the shrinkage is low, the occurrence of curling can be prevented, spreading can be prevented, and the cost of irradiation equipment can be reduced.

As an oligomer that can be used in combination with the monoacrylate, an epoxy acrylate oligomer and a urethane acrylate oligomer are particularly preferable.

It is preferable that, among the above-mentioned compounds, an alkoxy acrylate is used in an amount of 70 wt % or less and the remainder is an acrylate since good sensitivity and good spreading properties can be imparted.

In the present invention, when the above-mentioned acrylate compound is used as the other polymerizable compound (D), it is preferable for the above-mentioned acrylate compound to be 30 wt % or greater relative to the total weight of the other polymerizable compounds (i.e. the total amount of component (D)), more preferably 40 wt % or greater, and yet more preferably 50 wt % or greater. It is also possible for all of the other polymerizable compound (D) used in combination to be the above-mentioned acrylate compound.

In the present invention, with regard to selection of the polymerization initiator and the polymerizable compound, in addition to a combination of a radically polymerizable compound and a radical polymerization initiator, a radical/cationic hybrid type curing ink composition in which a cationically polymerizable compound and a cationic polymerization initiator as described below are used in combination therewith may be selected according to various intended purposes (e.g. as means of preventing degradation of the sensitivity due to the effect of shielding light by a colorant used in the ink composition).

The cationically polymerizable compound that can be used in the present invention is not particularly limited as long as it is a compound that initiates a polymerization reaction by virtue of an acid generated by a photo-acid generator and is cured, and various types of cationically polymerizable monomers known as cationically photopolymerizable monomers may be used. Examples of the cationically polymerizable monomer include epoxy compounds, vinyl ether compounds, oxetane compounds, etc. described in JP-A-6-9714, JP-A-2001-31892, JP-A-2001-40068, JP-A-2001-55507, JP-A-2001-310938, JP-A-2001-310937, JP-A-2001-220526, etc.

As the cationically polymerizable compound, for example, a polymerizable compound applied to a cationic polymerization-type photocuring resin is known, and in recent years polymerizable compounds that are applied to a cationic photopolymerization-type photocuring resin sensitized to a visible light wavelength region of 400 nm or higher have been disclosed in, for example, JP-A-6-43633 and JP-A-8-324137. They may also be applied to the ink composition of the present invention.

As the cationic polymerization initiator (photo-acid generator) that is used in combination with the above-mentioned cationically polymerizable compound in the present invention, for example, compounds that are used for chemically amplified photoresists or cationic photopolymerization are used (ref. 'Imejingu yo Yukizairyou' (Organic Materials for Imaging), Ed. The Japanese Research Association for Organic Electronics Materials, Bunshin Publishing Co. (1993), pp. 187-192).

Examples of the cationic polymerization initiator suitably used in the present invention are listed below.

That is, firstly, $B(C_6F_5)_4^-$, $PF_6^-$, $AsF_6^-$, $SbF_6^-$, and $CF_3SO_3^-$ salts of diazonium, ammonium, iodonium, sulfonium, phosphonium, etc. aromatic onium compounds can be cited. Secondly, sulfonated materials that generate a sulfonic acid can be cited. Thirdly, halides that photogenerate a hydrogen halide can also be used. Fourthly, iron arene complexes can be cited.

The above-mentioned cationic polymerization initiators may be used singly or in a combination of two or more types.

(E) Sensitizer

It is possible to add (E) a sensitizer to the ink composition of the present invention in order to promote decomposition of the polymerization initiator (B) by irradiation with actinic radiation. The sensitizer absorbs specific actinic radiation to attain an electronically excited state. The sensitizer in an electronically excited state contacts the polymerization initiator to thus cause electron transfer, energy transfer, heat generation, etc., thereby promoting a chemical change of the polymerization initiator, that is, decomposition and formation of a radical, an acid, or a base. As the sensitizer, a sensitizing dye is preferable.

The sensitizer may employ a compound that corresponds to the wavelength of actinic radiation used for generating an initiating species from the polymerization initiator (B) used in the ink composition.

Preferred examples of the sensitizing dye include those belonging to the types of compounds below and having an adsorption wavelength in the region of 350 nm to 450 nm.

Examples include polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (II) to (VI) below.

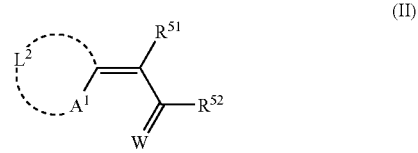

(II)

In Formula (II), $A^1$ denotes a sulfur atom or $NR^{50}$, $R^{50}$ denotes an alkyl group or an aryl group, $L^2$ denotes a non-metallic atomic group forming a basic nucleus of a dye in cooperation with the adjacent $A^1$ and carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

(III)

In Formula (III), Ar¹ and Ar² independently denote an aryl group and are connected to each other via bonding with -L³-. Here, L³ denotes —O— or —S—. W has the same meaning as that shown in Formula (II).

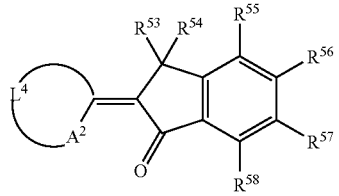

(IV)

In Formula (IV), $A_2$ denotes a sulfur atom or $NR^{59}$, $L^4$ denotes a non-metallic atomic group forming a basic nucleus of a dye in cooperation with the adjacent $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

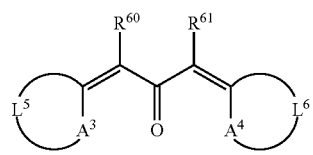

(V)

In Formula (V), $A^3$ and $A^4$ independently denote —S—, —$NR^{62}$—, or —$NR^{63}$—, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the adjacent $A^3$ and $A^4$ and adjacent carbon atom, and $R^{60}$ and $R^{61}$ independently denote a hydrogen atom or a monovalent non-metallic atomic group, or are bonded to each other to form an aliphatic or aromatic ring.

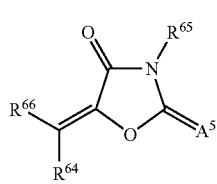

(VI)

In Formula (VI), $R^{66}$ denotes an aromatic ring or a hetero ring, which may have a substituent, and $A^5$ denotes an oxygen atom, a sulfur atom, or =$NR^{67}$. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

The amount of sensitizer (E) is preferably 0.1 to 20 wt % relative to the weight of the entire ink composition of the present invention, and more preferably 0.2 to 15 wt %.

Specific examples of the compounds represented by Formulae (II) to (VI) include those listed below.

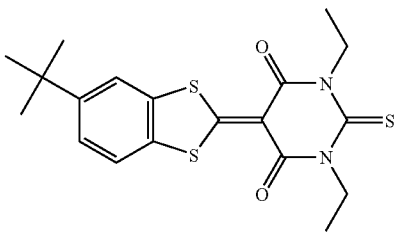
(E-1)

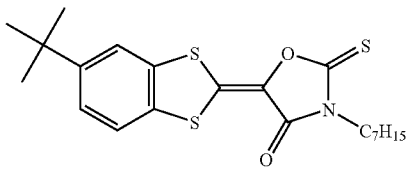
(E-2)

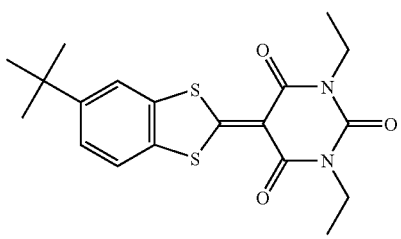
(E-3)

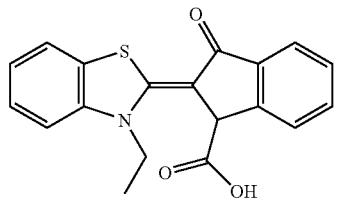
(E-4)

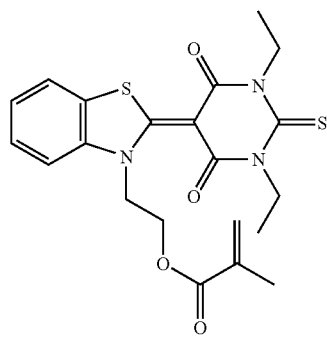
(E-5)

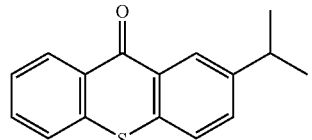
(E-6)

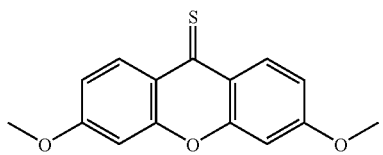
(E-7)

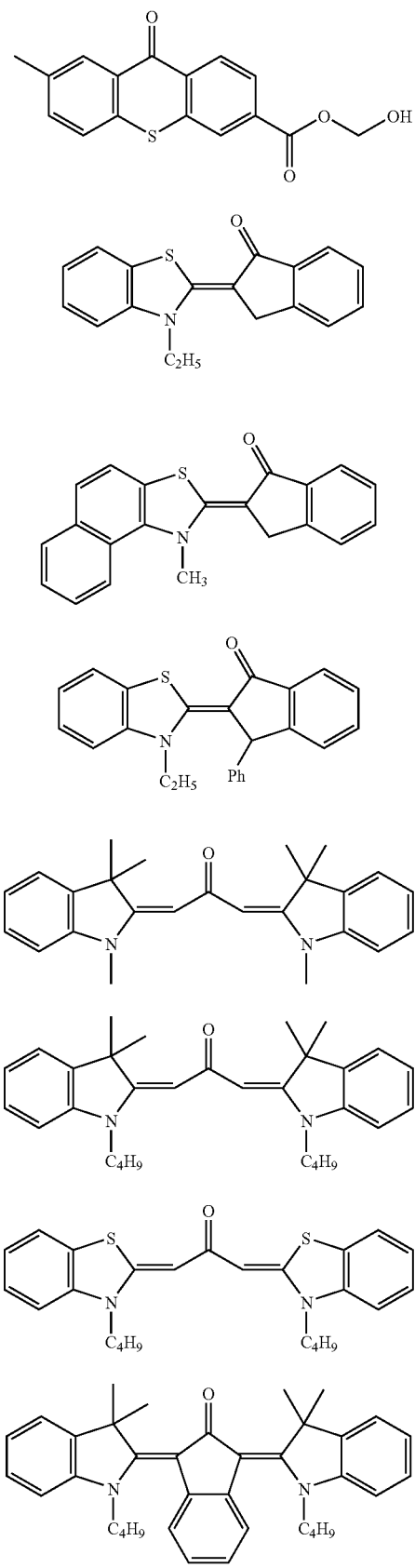
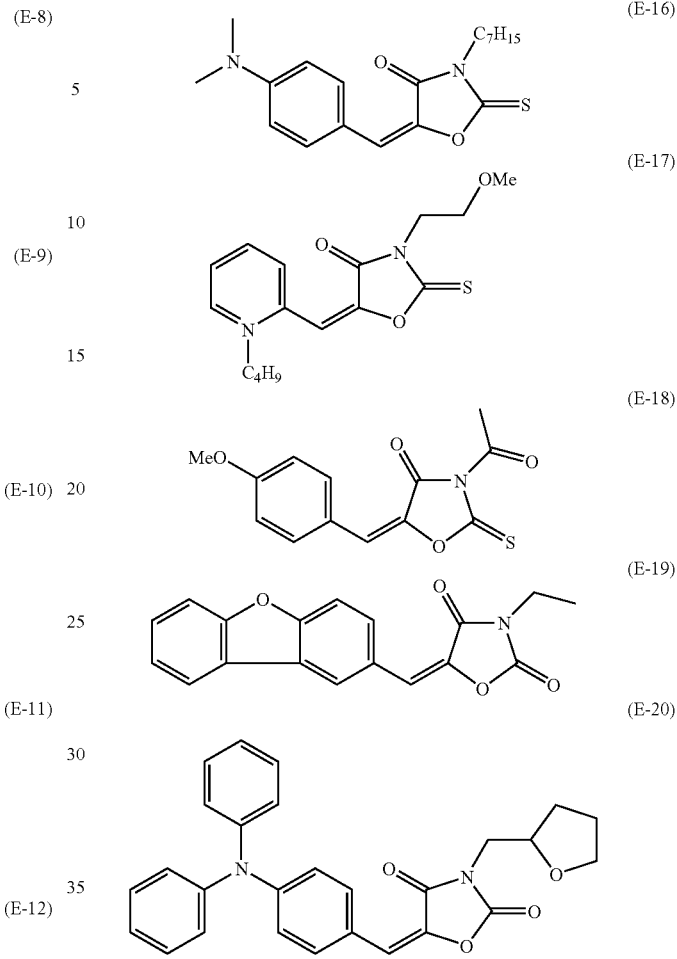

(F) Cosensitizer

The ink composition of the present invention may also comprise a cosensitizer. In the present invention, the cosensitizer has the function of further improving the sensitivity of the sensitizer to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H and Ge—H compounds described in JP-A-8-65779.

The amount of cosensitizer (F) is preferably 0.1 to 20 wt % relative to the weight of the entire ink composition of the present invention, and more preferably 0.2 to 15 wt %.

(G) Other Components

The ink composition of the present invention may comprise other components as necessary. Examples of the other components include polymerization inhibitors and solvents.

The polymerization inhibitor may be added from the point of view of enhancing the storage stability. When the ink composition of the present invention is used as an inkjet recording ink composition, it is preferably heated in the range of 40° C. to 80° C. to thus make it less viscous and then discharged, and in order to prevent clogging of a head due to thermal polymerization it is preferable to add a polymerization inhibitor. The polymerization inhibitor is preferably added at 200 to 20,000 ppm relative to the total amount of the ink composition of the present invention. Examples of the polymerization inhibitor include hydroquinone, benzoquinone, p-methoxyphenol, TEMPO, TEMPOL, and Al cupferron.

Taking into consideration that the ink composition of the present invention is a radiation curing type ink composition, it is preferable for it not to contain any solvent so that the ink composition can react quickly and be cured immediately after landing. However, as long as the curing speed, etc. of the ink composition is not affected, a specified solvent may be added. In the present invention, as a solvent, an organic solvent or water may be used. In particular, the organic solvent may be added in order to improve the adhesion to a recording medium (a support such as paper). It is effective not to add an organic solvent since the VOC problem can be avoided.

The amount of organic solvent is preferably 0.1 to 5 wt % relative to the total amount of the ink composition of the present invention, and more preferably 0.1 to 3 wt %.

In addition to the above, the ink composition of the present invention may contain a known compound as necessary. Examples thereof include a surfactant, a leveling additive, a matting agent and, for adjusting film physical properties, a polyester resin, polyurethane resin, vinyl resin, acrylic resin, rubber resin, or wax, which may be appropriately selected and added. Furthermore, in order to improve the adhesion to a recording medium such as a polyolefin or PET, a tackifier that does not inhibit polymerization is preferably added. Specific examples of the tackifier include high molecular weight tacky polymers described on pp. 5 and 6 of JP-A-2001-49200 (e.g. a copolymer formed from an ester of (meth)acrylic acid and an alcohol having an alkyl group of 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

The ink composition of the present invention may be used suitably as an ink composition for inkjet recording. Preferred physical properties in such a mode of use are now explained.

When the ink composition is used as an ink composition for inkjet recording, while taking dischargeability into consideration, the viscosity at the discharge temperature (preferably 25° C. to 80° C., and more preferably 25° C. to 50° C.) is preferably 7 to 30 mPa·s, and more preferably 7 to 25 mPa·s. For example, the ink composition of the present invention preferably has a viscosity at room temperature (25° C. to 30° C.) of 35 to 500 mPa·s, and more preferably 35 to 200 mPa·s.

With regard to the ink composition of the present invention, it is preferable that its component ratio is appropriately adjusted so that the viscosity is in the above-mentioned range. By setting the viscosity so that it is high at room temperature, even when a porous recording medium is used, penetration of the ink composition into the recording medium can be prevented, and uncured monomer can be reduced. Furthermore, spreading of the ink composition when ink composition droplets have landed can be suppressed, and as a result the image quality is improved.

The surface tension of the ink composition of the present invention is preferably 20 to 30 mN/m, and more preferably 23 to 28 mN/m. When recording is carried out on various types of recording medium such as polyolefin, PET, coated paper, and uncoated paper, from the viewpoint of spreading and penetration, it is preferably at least 20 mN/m, and from the viewpoint of wettability it is preferably not more than 30 mN/m.

Inkjet Recording Method

The inkjet recording method of the present invention and the inkjet recording device that can be used in the inkjet recording method are explained below.

The inkjet recording method of the present invention is a method for forming an image by discharging the ink composition of the present invention onto a recording medium (support, recording material, etc.) for inkjet recording and curing the ink composition by irradiating the ink composition so discharged onto the recording medium with actinic radiation.

That is, the inkjet recording method of the present invention comprises (a) a step of discharging the ink composition of the present invention onto a recording medium and (b) a step of curing the ink composition by irradiating the ink composition so discharged with actinic radiation.

The inkjet recording method of the present invention comprises the steps (a) and (b) above and thus forms an image from the ink composition cured on the recording medium.

The step (a) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in step (a) of the inkjet recording method of the present invention.

Examples of the inkjet recording device that can be used in the present invention include a device equipped with an ink composition supply system, a temperature sensor, and an actinic radiation source.

The ink composition supply system comprises, for example, a main tank containing the ink composition of the present invention, a supply pipe, an ink composition supply tank immediately before an inkjet head, a filter, and a piezo system inkjet head. The piezo system inkjet head may be driven so as to discharge multisize dots of 1 to 100 pL, and preferably 8 to 30 pL, at a resolution of 320×320 to 4,000× 4,000 dpi, preferably 400×400 to 1,600×1,600 dpi, and more preferably 720×720 dpi. Here, dpi referred to in the present invention means the number of dots per 2.54 cm.

As described above, since it is desirable for the radiation curing type ink composition to be discharged at a constant temperature as in the ink composition of the present invention, a section from the ink composition supply tank to the inkjet head can be thermally insulated and heated. A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition of the present invention is discharged using the above-mentioned inkjet recording device, the ink composition is preferably discharged after being heated to preferably 25° C. to 80° C., and more preferably 25° C. to 50° C., so as to reduce the viscosity of the ink composition to preferably 7 to 30 mPa·s, and more preferably 7 to 25 mPa·s. In particular, it is preferable to use an ink composition having an ink composition viscosity at 25° C. of 35 to 500 mP·s as the ink composition of the present invention since a large effect can be obtained. By employing this method, high discharge stability can be realized.

A radiation curing type ink composition such as the ink composition of the present invention generally has a viscosity that is higher than that of a water-based ink composition used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of the ink composition is preferably ±5° C. of a set temperature, more preferably ±2° C. of the set temperature, and yet more preferably ±1° C. of the set temperature.

A step (b) of curing the ink composition by irradiating the discharged ink composition with actinic radiation is now explained.

The ink composition discharged onto the recording medium is cured by irradiating with actinic radiation. This results from a polymerization reaction of the component (A) or the other polymerizable compound (D) used in combination as desired being caused and promoted by the function of an initiating species such as a radical, an acid, or a base generated as a result of decomposition of the polymerization initiator (B) contained in the ink composition of the present invention by irradiation with actinic radiation. In this process, if the sensitizer (E) is present in the ink composition together with the polymerization initiator (B), the sensitizer (E) in the system absorbs actinic radiation to attain an excited state and promotes decomposition of the polymerization initiator (B) by contacting the polymerization initiator (B), thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizer, the peak wavelength of the actinic radiation is, for example, preferably 200 to 600 nm, more preferably 300 to 450 nm, and yet more preferably 350 to 450 nm.

Furthermore, the polymerization initiation system of the ink composition of the present invention has sufficient sensitivity for low output actinic radiation. The output of the actinic radiation is therefore preferably 2,000 mJ/cm$^2$ or less, more preferably 10 to 2,000 mJ/cm$^2$, yet more preferably 20 to 1,000 mJ/cm$^2$, and particularly preferably 50 to 800 mJ/cm$^2$.

Moreover, the actinic radiation is desirably applied so that the illumination intensity on the exposed surface is preferably 10 to 2,000 mW/cm$^2$, and more preferably 20 to 1,000 mW/cm$^2$.

As an actinic radiation source, a mercury lamp, a gas/solid laser, etc. are mainly used, and as a light source used for curing a UV photocuring inkjet recording ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/Cm$^2$, and particularly preferably 50 to 800 mW/cm$^2$.

The ink composition of the present invention is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (preferably 0.01 to 0.5 sec., more preferably 0.02 to 0.3 sec., and yet more preferably 0.03 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light, and such a curing method may be applied to the inkjet recording method of the present invention.

By employing such an inkjet recording method, it is possible to maintain a uniform dot diameter for the landed ink composition even for various types of recording media having different surface wettability, thereby improving the image quality. In order to obtain a color image, it is preferable to superimpose colors in order from those with a low lightness. By superimposing ink compositions in order from one with low lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition of the present invention is cured with high sensitivity by irradiation with actinic radiation to thus form an image on the surface of the recording medium.

Lithographic Printing Plate and Production Process

It is possible to produce a lithographic printing plate by applying the ink composition of the present invention to a hydrophilic support by the inkjet recording method of the present invention and curing it.

A process for producing a lithographic printing plate by employing the inkjet recording method of the present invention (the process for producing a lithographic printing plate of the present invention) and a lithographic printing plate obtained thereby (the lithographic printing plate of the present invention) are explained below.

The lithographic printing plate of the present invention comprises a hydrophilic support and a hydrophobic image formed on the hydrophilic support. The process for producing this lithographic printing plate comprises the following steps.

(a') a step of discharging the ink composition of the present invention onto a hydrophilic support, and (b') a step of curing the ink composition by irradiating the discharged ink composition with actinic radiation so as to form a hydrophobic image on the hydrophilic support by curing the ink composition.

That is, a lithographic printing plate can be produced in the same manner as in the inkjet recording method of the present invention except that a support having a hydrophilic surface that is suitable as a lithographic printing plate support is used as a recording medium.

Conventionally, a lithographic printing plate has been produced by imagewise exposing to light a so-called PS plate having an arrangement in which a lipophilic photosensitive resin layer is provided on a hydrophilic support as described above so as to solubilize or cure the exposed area and form an image, followed by dissolving and removing a non-image area.

On the other hand, the lithographic printing plate of the present invention can be formed by employing the process for producing a lithographic printing plate of the present invention (the inkjet recording method of the present invention) so as to discharge an ink composition directly onto the surface of a hydrophilic support in accordance with digitized image information and cure it to form a hydrophobic image area. This enables a lithographic printing plate to be prepared more easily than by the conventional method.

Hydrophilic Support Used in Lithographic Printing Plate

The lithographic printing plate of the present invention has a hydrophilic support and a hydrophobic image formed on the surface of the support with the ink composition of the present invention.

The support for a lithographic printing plate (recording medium) onto which the ink composition of the present invention is discharged is not particularly limited, and any plate-shaped support having dimensional stability may be used, but when the image quality of a printed material obtained is taken into consideration, a support with a hydrophilic surface is preferable.

When a material for the support has hydrophilicity, it may be used as a support as it is, but when it has no hydrophilicity, the surface may be subjected to a hydrophilization treatment.

Examples of materials used in the support include paper, paper laminated with a plastic (e.g. polyethylene, polypropylene, polystyrene, etc.), a metal sheet (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper or plastic film on which the above-mentioned metal is laminated or vapor-deposited. Preferred examples of the support include a polyester film and aluminum sheet. Among these, aluminum sheet is particularly preferable since the dimensional stability is good and it is relatively inexpensive.

The aluminum sheet is a pure aluminum sheet, an alloy sheet containing aluminum as a main component and a small amount of a different element, or a thin film of aluminum or an aluminum alloy laminated with a plastic. Examples of the different element contained in the aluminum alloy include silicon, iron, manganese, copper, magnesium, chromium, zinc, bismuth, nickel, and titanium. The content of the different element in the alloy is preferably equal to or less than 10 wt %. In the present invention, a pure aluminum sheet is preferable, but since it is difficult to produce completely pure aluminum because of the refining technique, a trace amount of a different element may be contained. The composition of the aluminum sheet is not specified, and a known material may be utilized as appropriate.

The support preferably has a thickness of 0.1 to 0.6 mm, and more preferably 0.15 to 0.4 mm.

Prior to the aluminum sheet being used, it is preferably subjected to a surface treatment such as a surface roughening treatment or an anodizing treatment. Surface treatment makes it easy to improve the hydrophilicity and ensure that there is good adhesion between a hydrophobic image and the support. Prior to the aluminum sheet being subjected to the surface roughening treatment, it may be subjected as desired to a degreasing treatment using a surfactant, an organic solvent, an aqueous alkaline solution, etc. in order to remove rolling oil on the surface.

The surface roughening treatment for the aluminum sheet surface may be carried out by various types of methods, and examples thereof include a mechanical surface roughening treatment, an electrochemical surface roughening treatment (a surface roughening treatment involving dissolving the surface electrochemically), and a chemical surface roughening treatment (a surface roughening treatment involving selectively dissolving the surface chemically).

As a method for the mechanical surface roughening treatment, a known method such as a ball grinding method, a brush grinding method, a blast grinding method, or a buff grinding method may be used. It is also possible to use a transfer method in which an irregular shape is transferred using a roller provided with irregularities in an aluminum rolling stage.

As a method for the electrochemical surface roughening treatment, for example, a method in which alternating current or direct current is applied in an electrolyte solution containing an acid such as hydrochloric acid or nitric acid can be cited. It is also possible to employ a method as described in JP-A-54-63902 in which a mixed acid is used.

The aluminum sheet subjected to a surface roughening treatment is subjected as necessary to an alkali etching treatment using an aqueous solution of potassium hydroxide, sodium hydroxide, etc.; furthermore, after neutralization, it may be subjected to an anodizing treatment as desired in order to improve the abrasion resistance.

As an electrolyte that may be used for the anodizing treatment of the aluminum sheet, various types of electrolytes that form a porous oxide film may be used. In general, sulfuric acid, hydrochloric acid, oxalic acid, chromic acid, or a mixed acid thereof may be used. The concentration of the electrolyte may be determined as appropriate according to the type of electrolyte.

Conditions for the anodizing treatment depend on the type of electrolyte used and cannot be specified, but in general the electrolyte solution concentration is 1 to 80 wt %, the solution temperature is 5° C. to 70° C., the current density is 5 to 60 A/dm$^2$, the voltage is 1 to 100 V, and the electrolysis time is 10 sec. to 5 min. The amount of anodized film formed is preferably 1.0 to 5.0 g/m$^2$, and more preferably 1.5 to 4.0 g/m$^2$. It is preferable for it to be in this range since good plate life and good scratch resistance of a non-image area of a lithographic printing plate can be obtained.

As the support that can be used in the present invention, a substrate that has been subjected to the above-mentioned surface treatment and has an anodized film may be used as it is, but in order to further improve the adhesion to the hydrophobic image, the hydrophilicity, the contamination resistance, etc., the substrate may appropriately be subjected as necessary to a treatment for enlarging micropores of the anodized film, a sealing treatment, or a surface hydrophilization treatment involving immersion in an aqueous solution containing a hydrophilic compound, which are described in JP-A-2001-253181 or JP-A-2001-322365. These enlarging and sealing treatments are not limited to those described therein, and any conventionally known methods may be employed.

Sealing Treatment

The sealing treatment may be vapor sealing, a treatment with an aqueous solution containing an inorganic fluorine compound such as a single treatment with fluorozirconic acid or a treatment with sodium fluoride, vapor sealing with added lithium chloride, or a sealing treatment with hot water.

Among these, the sealing treatment with an aqueous solution containing an inorganic fluorine compound, the sealing treatment with steam, and the sealing treatment with hot water are preferable. Each thereof is explained below.

Sealing Treatment with Aqueous Solution Containing Inorganic Fluorine Compound

In the sealing treatment with an aqueous solution containing an inorganic fluorine compound, a metal fluoride can suitably be used as the inorganic fluorine compound.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, sodium fluorozirconate, sodium fluorotitanate, fluorozirconic acid, and fluorotitanic acid are preferable.

The concentration of the inorganic fluorine compound in the aqueous solution is preferably at least 0.01 wt % from the viewpoint of sealing of micropores on an anodized coating being carried out sufficiently, and more preferably at least 0.05 wt %, and it is preferably no greater than 1 wt % from the viewpoint of contamination resistance, and more preferably no greater than 0.5 wt %.

The aqueous solution containing an inorganic fluorine compound preferably further contains a phosphate compound. It is preferable for a phosphate compound to be contained since the hydrophilicity of the surface of the anodized coating improves and the machine developability and the contamination resistance can be improved.

Preferred examples of the phosphate compound include phosphates of a metal such as an alkali metal or an alkaline earth metal.

Specific examples thereof include zinc phosphate, aluminum phosphate, ammonium phosphate, ammonium phosphate dibasic, ammonium dihydrogen phosphate, potassium dihydrogen phosphate, potassium phosphate dibasic, calcium phosphate, ammonium sodium hydrogen phosphate, magnesium hydrogen phosphate, magnesium phosphate, ferrous phosphate, ferric phosphate, sodium dihydrogen phosphate, sodium phosphate, sodium phosphate dibasic, lead phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate, and sodium pyrophosphate. Among these, sodium dihydrogen phosphate, sodium phosphate dibasic, potassium dihydrogen phosphate, and potassium phosphate dibasic are preferable.

The combination of the inorganic fluorine compound and the phosphate compound is not particularly limited, but the aqueous solution preferably comprises at least sodium fluorozirconate as the inorganic fluorine compound and at least sodium dihydrogen phosphate as the phosphate compound.

The concentration of the phosphate compound in the aqueous solution is preferably at least 0.01 wt % from the viewpoint of improving machine developability and contamination resistance, and more preferably at least 0.1 wt %, and it is preferably no greater than 20 wt % from the viewpoint of solubility, and more preferably no greater than 5 wt %.

The proportion of each compound in the aqueous solution is not particularly limited, but the ratio by weight of the inorganic fluorine compound and the phosphate compound is preferably 1/200 to 10/1, and more preferably 1/30 to 2/1.

Furthermore, the temperature of the aqueous solution is preferably at least 20° C., and more preferably at least 40° C., and it is preferably no higher than 100° C., and more preferably no higher than 80° C.

Moreover, the pH of the aqueous solution is preferably at least 1, and more preferably at least 2, and it is preferably no greater than 11, and more preferably no greater than 5.

A method for the sealing treatment with the aqueous solution containing an inorganic fluorine compound is not particularly limited and, for example, an immersion method and a spray method may be used. They may be employed once or a plurality of times, or in a combination of two or more types.

Among these, the immersion method is preferable. When the treatment is carried out by the immersion method, the treatment time is preferably at least 1 sec., and more preferably at least 3 sec., and it is preferably no greater than 100 sec., and more preferably no greater than 20 sec.

Sealing Treatment with Steam

With regard to the sealing treatment with steam, for example, a method in which an anodized coating is contacted with steam at high pressure or normal pressure continuously or discontinuously can be cited.

The temperature of the steam is preferably at least 80° C., and more preferably at least 95° C., and it is preferably no greater than 105° C.

The pressure of the steam is preferably in the range of (atmospheric pressure−50 mmAq) to (atmospheric pressure+ 300 mmAq) ($1.008 \times 10^5$ to $1.043 \times 10^5$ Pa).

Furthermore, the time for which the coating is contacted with steam is preferably at least 1 sec., and more preferably at least 3 sec., and it is preferably no greater than 100 sec., and more preferably no greater than 20 sec.

Sealing Treatment with Hot Water

With regard to the sealing treatment with hot water (steam), for example, a method in which an aluminum plate having an anodized coating formed thereon is immersed in hot water can be cited.

The hot water may contain an inorganic salt (e.g. a phosphate) or an organic salt.

The temperature of the hot water is preferably at least 80° C., and more preferably at least 95° C., and it is preferably no greater than 100° C.

Furthermore, the time for which immersion in hot water is carried out is preferably at least 1 sec., and more preferably at least 3 sec., and it is preferably no greater than 100 sec., and more preferably no greater than 20 sec.

With regard to a hydrophilization treatment that is applied to a support in the present invention, there is an alkali metal silicate method, as disclosed in U.S. Pat. Nos. 2,714,066, 3,181,461, 3,280,734, and 3,902,734. In this method, a support is immersed in an aqueous solution of sodium silicate, etc., or subjected to electrolysis. In addition, there is a method in which a support is treated with potassium fluorozirconate, as described in JP-B-36-22063, and a method in which a support is treated with polyvinylphosphonic acid, as described in U.S. Pat. Nos. 3,276,868, 4,153,461, and 4,689,272.

In the present invention, it is preferable for the support to have a center line average roughness of 0.10 to 1.2 μm. It is preferable for it to be in this range since good adhesion to a hydrophobic image, good plate life, and good contamination resistance can be obtained.

(a') Step of Discharging the Ink Composition of the Present Invention onto Hydrophilic Support First, the ink composition of the present invention is discharged onto a hydrophilic support. This step may employ a conventionally known inkjet recording device in the same manner as in the above-mentioned inkjet recording method. A preferred ink composition temperature and viscosity when the ink composition is discharged using the inkjet recording device are the same as above and the control method therefor is also the same as above.

(b') Step of Curing Ink Composition by Irradiating Discharged Ink Composition with Actinic Radiation so as to Form Hydrophobic Image by Curing Ink Composition The ink composition discharged onto the surface of a hydrophilic support is cured by irradiation with actinic radiation. Details of this curing mechanism are the same as those described for the inkjet recording method. Furthermore, the actinic radiation source used for curing the ink composition and irradiation conditions therefor are also the same as those described for the inkjet recording method.

Via the above-mentioned steps, a hydrophobic image is formed on the surface of a hydrophilic support by curing the ink composition of the present invention, thus giving a lithographic printing plate.

In this way, by producing a lithographic printing plate by application of the inkjet recording method of the present invention, the diameter of dots of the ink composition that has landed can be maintained at a constant size even for lithographic printing plate supports having different surface wettabilities and, as a result, a hydrophobic image can be formed with good precision.

Furthermore, as described above, the ink composition of the present invention can be cured by actinic radiation with high sensitivity, and a hydrophobic region (hydrophobic image) having excellent adhesion to a support and excellent film properties can be formed.

From the above, the lithographic printing plate of the present invention has high image quality and also has excellent plate life.

Needless to say, the ink composition of the present invention not only forms an image area of such a lithographic printing plate but is also useful as a normal ink composition.

In accordance with the present invention, it is possible to provide an ink composition that has excellent adhesion to a recording medium in an image obtained by curing the ink composition, and, an inkjet recording method employing the ink composition.

Furthermore, in accordance with the present invention, there can be provided a lithographic printing plate obtained by using an ink composition that has excellent adhesion to a recording medium in an image obtained by curing the ink composition, and a process for producing a lithographic printing plate.

EXAMPLES

The present invention is explained in a further detail below by reference to Examples, but the present invention is not limited by these Examples.

The Examples below relate to UV inkjet ink compositions of each color.

Example 1

The components below were stirred using a high-speed water-cooled stirrer to give a cyan UV inkjet ink composition.

| Cyan ink composition | |
|---|---|
| (A) 1,9-Nonane diacrylate | 17.0 parts |
| (D) Actilane 421 (acrylate monomer manufactured by Akcros) | 40.0 parts |
| (D) Photomer 2017 (UV diluting agent manufactured by EChem) | 12.4 parts |
| Solsperse 32000 (dispersant manufactured by Noveon) | 0.4 parts |
| (C) Irgalite Blue GLVO (pigment manufactured by Ciba Specialty Chemicals) | 3.6 parts |
| Genorad 16 (stabilizer manufactured by Rahn) | 0.05 parts |
| (D) Rapi-Cure DVE-3 (vinyl ether manufactured by ISP Europe) | 10.0 parts |
| (B) Lucirin TPO (photopolymerization initiator manufactured by BASF) | 8.5 parts |
| (B) Benzophenone (photopolymerization initiator) | 4.0 parts |
| (B) Irgacure 184 (photopolymerization initiator manufactured by Ciba Specialty Chemicals) BYK 307 (antifoaming agent manufactured by BYK Chemie) | 4.0 parts 0.05 parts |

ACTILANE 421 above is a propoxylated neopentyl glycol diacrylate (difunctional acrylate).

Evaluation of Ink Composition

Printing was carried out on a polyvinyl chloride sheet using the cyan ink composition thus obtained, irradiation was carried out by passing it under the light of an iron-doped UV lamp (power 120 W/cm) at a speed of 40 m/min, and the ink composition was cured to give a printed material.

Evaluation was carried out as follows.

Adhesion to the recording medium was evaluated by a crosshatch test. From the results, a high adhesion of ISO Class: 0 was exhibited.

The crosshatch test was carried out in accordance with ISO2409 (ASTM D 3359). A cured film was crosscut into 25 squares at intervals of 2.0 mm (6 cuts lengthwise and widthwise), a pressure sensitive tape (product name: SCOTCH TAPE (3M600), manufactured by SUMITOMO 3M) was strongly affixed to the crosscut part, the pressure sensitive tape was then rapidly peeled off, and the presence or absence of peeling off of the cured film was examined. The evaluation results are expressed by ISO Classes of 0 to 5.

| ISO Class: 0 | No peeling. |
|---|---|
| ISO Class: 1 | 5% peeled. |
| ISO Class: 2 | 20% peeled. |
| ISO Class: 3 | 50% peeled. |
| ISO Class: 4 | 80% peeled. |
| ISO Class: 5 | 100% peeled. |

The results are given in Table 1 below.

Example 2

The components below were stirred using a high-speed water-cooled stirrer to give a magenta UV inkjet ink composition.

| Magenta ink composition | |
|---|---|
| (A) 1,9-Nonane diacrylate | 14.0 parts |
| (D) Actilane 421 | 41.4 parts |
| (acrylate monomer manufactured by Akcros) | |
| (D) Photomer 2017 (UV diluting agent manufactured by EChem) | 16.0 parts |
| Solsperse 32000 (dispersant manufactured by Noveon) | 0.4 parts |
| (C) Cinquasia Magenta RT-355D | 3.6 parts |
| (pigment manufactured by Ciba Specialty Chemicals) | |
| Genorad 16 (stabilizer manufactured by Rahn) | 0.05 parts |
| (D) Rapi-Cure DVE-3 | 8.0 parts |
| (vinyl ether manufactured by ISP Europe) | |
| (B) Lucirin TPO | 8.5 parts |
| (photopolymerization initiator manufactured by BASF) | |
| (B) Benzophenone (photopolymerization initiator) | 4.0 parts |
| (B) Irgacure 184 | 4.0 parts |
| (photopolymerization initiator manufactured by Ciba Specialty Chemicals) | |
| BYK 307 (antifoaming agent manufactured by BYK Chemie) | 0.05 parts |

Printing was carried out on a polyvinyl chloride sheet using the magenta ink composition thus obtained, and irradiation was carried out by passing it under the light of an iron-doped UV lamp (power 120 W/cm) at a speed of 40 m/min. A printed material obtained using this ink composition was evaluated in the same manner as in Example 1. The results are given in Table 1 below.

Example 3

The components below were stirred using a high-speed water-cooled stirrer to give a yellow UV inkjet ink composition.

| Yellow ink composition | |
|---|---|
| (A) 1,9-Nonane diacrylate | 18.0 parts |
| (D) Actilane 421 | 38.4 parts |
| (the above-mentioned acrylate monomer manufactured by Akcros) | |
| (D) Photomer 2017 (UV diluting agent manufactured by EChem) | 17.0 parts |
| Solsperse 32000 (dispersant manufactured by Noveon) | 0.4 parts |
| (C) Cromophtal Yellow LA | 3.6 parts |
| (pigment manufactured by Ciba Specialty Chemicals) | |
| Genorad 16 (stabilizer manufactured by Rahn) | 0.05 parts |
| (D) Rapi-Cure DVE-3 | 6.0 parts |
| (vinyl ether manufactured by ISP Europe) | |
| (B) Lucirin TPO | 8.5 parts |
| (photopolymerization initiator manufactured by BASF) | |
| (B) Benzophenone (photopolymerization initiator) | 4.0 parts |
| (B) Irgacure 184 | 4.0 parts |
| (photopolymerization initiator manufactured by Ciba Specialty Chemicals) | |
| BYK 307 (antifoaming agent manufactured by BYK Chemie) | 0.05 parts |

Printing was carried out on a polyvinyl chloride sheet using the yellow ink composition thus obtained, and irradiation was carried out by passing it under the light of an iron-doped UV lamp (power 120 W/cm) at a speed of 40 m/min. A printed material obtained using this ink composition was evaluated in the same manner as in Example 1. The results are given in Table 1 below.

Example 4

The components below were stirred using a high-speed water-cooled stirrer to give a black UV inkjet ink composition.

| ink composition | |
|---|---|
| (A) 1,9-Nonane diacrylate | 9.0 parts |
| (D) Actilane 421 | 48.4 parts |
| (the above-mentioned acrylate monomer manufactured by Akcros) | |
| (D) Photomer 2017 (UV diluting agent manufactured by EChem) | 16.0 parts |
| Solsperse 32000 (dispersant manufactured by Noveon) | 0.4 parts |
| (C) Microlith Black C-K | 2.6 parts |
| (pigment manufactured by Ciba Specialty Chemicals) | |
| Genorad 16 (stabilizer manufactured by Rahn) | 0.05 parts |
| (D) Rapi-Cure DVE-3 | 7.0 parts |
| (vinyl ether manufactured by ISP Europe) | |
| (B) Lucirin TPO | 8.5 parts |
| (photopolymerization initiator manufactured by BASF) | |
| (B) Benzophenone (photopolymerization initiator) | 4.0 parts |
| (B) Irgacure 184 | 4.0 parts |
| (photopolymerization initiator manufactured by Ciba Specialty Chemicals) | |
| BYK 307 (antifoaming agent manufactured by BYK Chemie) | 0.05 parts |

Printing was carried out on a polyvinyl chloride sheet using the black ink composition thus obtained, and irradiation was carried out by passing it under the light of an iron-doped UV lamp (power 120 W/cm) at a speed of 40 m/min. A printed material obtained using this ink composition was evaluated in the same manner as in Example 1. The results are given in Table 1 below.

Example 5

A cyan ink composition was obtained in the same manner as in Example 1 except that 1,6-hexane diacrylate was used instead of 1,9-nonane diacrylate.

Example 6

A cyan ink composition was obtained in the same manner as in Example 1 except that 1,9-nonane diacrylamide was used instead of 1,9-nonane diacrylate.

Example 7

A cyan ink composition was obtained in the same manner as in Example 1 except that 1,9-nonane divinyl ether was used instead of 1,9-nonane diacrylate.

Example 8

A cyan ink composition was obtained in the same manner as in Example 1 except that 1,6-hexane dimethacrylate was used instead of 1,9-nonane diacrylate.

Example 9

A cyan ink composition was obtained in the same manner as in Example 1 except that 1,12-dodecane diacrylate was used instead of 1,9-nonane diacrylate.

Comparative Example 1

A cyan ink composition was obtained in the same manner as in Example 1 except that 1,9-nonane diacrylate was not used.

Comparative Example 2

A cyan ink composition was obtained in the same manner as in Example 1 except that hexyl acrylate was used instead of 1,9-nonane diacrylate.

Comparative Example 3

A cyan ink composition was obtained in the same manner as in Example 1 except that 1,2-butane diacrylate was used instead of 1,9-nonane diacrylate.

The ink compositions of Examples 5 to 9 and Comparative Examples 1 to 3 obtained above were used in the same manner as in Example 1 to give printed materials, and evaluation was carried out. The evaluation results are given in Table 1.

TABLE 1

| | Ink Composition | Component (A) | Adhesion |
|---|---|---|---|
| Ex. 1 | Cyan | 1,9-Nonane diacrylate | ISO Class: 0 |
| Ex. 2 | Magenta | 1,9-Nonane diacrylate | ISO Class: 0 |
| Ex. 3 | Yellow | 1,9-Nonane diacrylate | ISO Class: 0 |
| Ex. 4 | Black | 1,9-Nonane diacrylate | ISO Class: 0 |
| Ex. 5 | Cyan | 1,6-Hexane diacrylate | ISO Class: 0 |
| Ex. 6 | Cyan | 1,9-Nonane diacrylamide | ISO Class: 0 |
| Ex. 7 | Cyan | 1,9-Nonane divinyl ether | ISO Class: 0 |
| Ex. 8 | Cyan | 1,6-Hexane dimethacrylate | ISO Class: 0 |
| Ex. 9 | Cyan | 1,12-Dodecane diacrylate | ISO Class: 0 |
| Comp. Ex. 1 | Cyan | None | ISO Class: 5 |
| Comp. Ex. 2 | Cyan | Hexyl acrylate | ISO Class: 4 |
| Comp. Ex. 3 | Cyan | 1,2-Butane diacrylate | ISO Class: 4 |

As shown in Table 1, the ink composition of Examples 1 to 9 had excellent adhesion to the recording medium.

Example 10

Preparation of Support

A melt was prepared using an aluminum alloy containing Si (0.06 wt %), Fe (0.30 wt %), Cu (0.025 wt %), Mn (0.001 wt %), Mg (0.001 wt %), Zn (0.001 wt %), and Ti (0.03 wt %), the remainder being Al and its inevitable impurities, and it was subjected to a melt treatment and filtration, and then formed into an ingot having a thickness of 500 mm and a width of 1,200 mm by a DC casting method. After the surface thereof was shaved off by an average thickness of 10 mm by means of a scalping machine, it was thermally maintained at 550° C. for about 5 hours, and when the temperature dropped to 400° C., it was made into a rolled sheet having a thickness of 2.7 mm by means of a hot rolling mill. It was further thermally treated at 500° C. by means of a continuous annealing machine, and then finished so as to have a thickness of 0.24 mm by means of cold rolling, thus giving an aluminum sheet of JIS 1050 material. The aluminum thus obtained had an average crystal minor axis of 50 μm and an average crystal major axis of 300 μm. After making the width of this aluminum 1,030 mm, it was subjected to the surface treatment below to give an aluminum support.

Surface Treatment

The surface treatment involved consecutively carrying out the various treatments (a) to (j) below. After each treatment and washing with water, liquid was removed by a nip roll.

(a) Mechanical Roughening Treatment

The surface of the aluminum sheet was subjected to a mechanical roughening treatment by means of a rotating roll-shaped nylon brush while supplying a suspension of an abrasive (pumice) having a specific gravity of 1.12 in water as an abrasive slurry to the surface of the aluminum sheet. The abrasive had an average particle size of 30 μm and a maximum particle size of 100 μm. The material of the nylon brush was nylon-6, 10, the bristle length was 45 mm, and the diameter of the bristles was 0.3 mm. The nylon brush was formed by making holes in a stainless steel tube having a diameter of 300 mm and densely implanting the bristles. Three rotating brushes were used. The distance of two support rolls (ϕ200 mm) below the brush was 300 mm. The brush rolls were pressed against the aluminum sheet so that the load on a drive motor for rotating the brushes increased by 7 kW from the load before pressing the brush rolls. The direction of rotation of the brushes was the same as the direction in which the aluminum sheet moved. The rotational speed of the brushes was 200 rpm.

(b) Alkali Etching Treatment

The aluminum sheet obtained above was subjected to an etching treatment by means of a spray using an aqueous solution having a sodium hydroxide concentration of 2.6 wt %, an aluminum ion concentration of 6.5 wt %, and a temperature of 70° C. so as to dissolve 10 g/m² of the aluminum sheet. Subsequently, it was washed with water by means of a spray.

(c) Desmutting Treatment

A desmutting treatment was carried out by means of a spray using an aqueous solution having a nitric acid concentration of 1 wt % and a temperature of 30° C. (containing 0.5 wt % of aluminum ion), and following this washing with water was carried out by means of a spray. The aqueous solution of nitric acid used in the desmutting treatment employed liquid waste from a step involving carrying out an electrochemical roughening treatment using alternating current in an aqueous solution of nitric acid.

(d) Electrochemical Roughening Treatment

An electrochemical roughening treatment was carried out consecutively using an ac voltage of 60 Hz. An electrolytic solution in this process was a 10.5 g/L aqueous solution of nitric acid (containing 5 g/L of aluminum ion and 0.007 wt % of ammonium ion), and the solution temperature was 50° C. The electrochemical roughening treatment was carried out using as an ac power source waveform a trapezoidal rectangular wave alternating current having a duty ratio of 1:1 and a time from zero to peak current value of 0.8 msec, with a carbon electrode as a counter electrode. Ferrite was used as an auxiliary anode.

The current density was 30 A/dm$^2$ as a peak current value, and the quantity of electricity was 220 C/dm$^2$ as the total quantity of electricity when the aluminum sheet was the anode. 5% of the current flowing from the power source was diverted to the auxiliary anode. Following this, washing with water was carried out by means of a spray.

(e) Alkali Etching Treatment

The aluminum sheet was subjected to an etching treatment at 32° C. by means of a spray using an aqueous solution having a sodium hydroxide concentration of 26 wt % and an aluminum ion concentration of 6.5 wt % so as to dissolve 0.50 g/m$^2$ of the aluminum sheet, remove a smut component containing aluminum hydroxide as a main component formed in the previous paragraph when carrying out the electrochemical roughening treatment using alternating current, and dissolve an edge portion of a pit formed to thus make the edge portion smooth. Subsequently, washing with water was carried out by means of a spray.

(f) Desmutting Treatment

A desmutting treatment was carried out by means of a spray using an aqueous solution having a nitric acid concentration of 15 wt % and a temperature of 30° C. (containing 4.5 wt % of aluminum ion), and following this washing with water was carried out by means of a spray. The aqueous solution of nitric acid used in the desmutting treatment employed liquid waste from the step involving carrying out the electrochemical roughening treatment using alternating current in an aqueous solution of nitric acid.

(g) Electrochemical Roughening Treatment

An electrochemical roughening treatment was carried out consecutively using an ac voltage of 60 Hz. The electrolytic solution in this process was a 5.0 g/L aqueous solution of hydrochloric acid (containing 5 g/L of aluminum ion), and the temperature was 35° C. The electrochemical roughening treatment was carried out using as an ac power source waveform a trapezoidal rectangular wave alternating current having a duty ratio of 1:1 and a time from zero to peak current value of 0.8 msec, with a carbon electrode as a counter electrode. Ferrite was used as an auxiliary anode.

The current density was 25 A/dm$^2$ as a peak current value, and the quantity of electricity was 50 C/dm$^2$ as the total quantity of electricity when the aluminum sheet was the anode. Following this, washing with water was carried out by means of a spray.

(h) Alkali Etching Treatment

The aluminum sheet was subjected to an etching treatment at 32° C. by means of a spray using an aqueous solution having a sodium hydroxide concentration of 26 wt % and an aluminum ion concentration of 6.5 wt % so as to dissolve 0.12 g/m$^2$ of the aluminum sheet, remove a smut component containing aluminum hydroxide as a main component formed in the previous paragraph when carrying out the electrochemical roughening treatment using alternating current, and dissolve an edge portion of a pit formed to thus make the edge portion smooth. Subsequently, washing with water was carried out by means of a spray.

(i) Desmutting Treatment

A desmutting treatment was carried out by means of a spray using an aqueous solution having a nitric acid concentration of 25 wt % and a temperature of 60° C. (containing 0.5 mass % of aluminum ion), and following this washing with water was carried out by means of a spray.

(i) Anodizing Treatment

An anodizing treatment was carried out using an anodizing system (first and second electrolysis section lengths 6 m each, first and second power supply section lengths 3 m each, and first and second power supply electrode lengths 2.4 m each). Sulfuric acid was used as an electrolytic solution supplied to the first and second electrolysis sections. Each of the electrolytic solutions had a sulfuric acid concentration of 50 g/L (containing 0.5 wt % of aluminum ion) and a temperature of 20° C. Following this, washing with water was carried out by means of a spray. The final amount of oxidized film was 2.7 g/m$^2$.

Preparation and Evaluation of Lithographic Printing Plate

Printing was carried out on the aluminum support prepared above using the ink composition of Example 1, and an image was formed and cured in the same manner as in Example 1.

This was used as a lithographic printing plate, and evaluation of the image and evaluation of plate life were carried out by the methods below.

a. Evaluation of Image

A lithographic printing plate prepared using the ink composition of Example 1 was mounted in a Heidel KOR-D machine, and printing was carried out by supplying an ink (sheet-feed VALUES-G magenta (manufactured by Dainippon Ink and Chemicals, Inc.)) and a dampening solution (Ecolity 2 (manufactured by Fuji Photo Film Co., Ltd.)). After printing 100 sheets, the printed material was visually evaluated. From the results, it was ascertained that good images free from white spots in an image area and stains in a non-image area were obtained.

b. Evaluation of Plate Life

When printing was carried out under these conditions, 5,000 sheets or greater of high quality printed material free from white spots in an image area and stains in a non-image area were obtained, and it was ascertained that the plate life was at a level that would cause no problems in practical use.

What is claimed is:

1. An ink composition comprising:
   a polymerizable compound;
   (B) a polymerization initiator; and
   (C) a colorant,
   wherein the polymerizable compound consists of a radical polymerizable compound,
   the radical polymerizable compound comprises one type of radical polymerizable compound (monomer (A)) selected from the group consisting of a difunctional (meth)acrylic acid ester or amide having a straight chain alkylene group of 8 to 12 carbons, and a difunctional vinyl ether having a straight chain alkylene group of 8 to 12 carbons and (D) another radical polymerizable compound,
   the polymerization initiator (B) consists of a radical polymerization initiator,
   the other radical polymerizable compound (D) comprises a vinyl ether compound, and
   the monomer (A) is one type of compound selected from the group consisting of 1,8-octane diacrylate, 1,9-nonane diacrylate, 1,10-decane diacrylate, 1,11-undecane diacrylate, 1,12-dodecane diacrylate, 1,8-octane dimethacrylate, 1,9-nonane dimethacrylate, 1,10-decane dimethacrylate, 1,11-undecane dimethacrylate, 1,12-dodecane dimethacrylate, 1,8-octane diacrylamide, 1,9-nonane diacrylamide, 1,10-decane diacrylamide, 1,11-undecane diacrylamide, 1,12-dodecane diacrylamide, 1,8-octane divinyl ether, 1,9-nonane divinyl ether, 1,10-decane divinyl ether, 1,11-undecane divinyl ether, and 1,12-dodecane divinyl ether.

2. The ink composition according to claim 1, wherein the monomer (A) is one type of compound selected from the group consisting of an ester of (meth)acrylic acid and a diol having a straight chain alkylene group of 8 to 12 carbons, an amide of (meth)acrylic acid and a diamine having a straight chain alkylene group of 8 to 12 carbons, and a vinyl ether of a diol having a straight chain alkylene group of 8 to 12 carbons.

3. The ink composition according to claim 1, wherein the ink composition of claim 1 comprises two or three types of monomers (A).

4. The ink composition according to claim 1, wherein the ink composition of claim 1 comprises two or three types of difunctional (meth)acrylic acid ester having a straight chain alkylene group of 8 to 10 carbons as the monomer (A).

5. The ink composition according to claim 1, wherein the monomer (A) is contained at 10 wt % or greater relative to the total content of polymerizable compound in the ink composition.

6. The ink composition according to claim 1, wherein the ink position of claim 1 is for inkjet recording.

7. An inkjet recording method comprising:
a step (a) of discharging the ink composition according to claim 1 onto a recording medium; and
a step (b) of irradiating the discharged ink composition with actinic radiation so as to cure the ink composition.

8. A process for producing a lithographic printing plate, the process comprising:
a step (a') of discharging the ink composition according to claim 1 onto a hydrophilic support; and
a step (b') of irradiating the discharged ink composition with actinic radiation so as to cure the ink composition, thus forming a hydrophobic image on the hydrophilic support by curing the ink composition.

9. A lithographic printing plate produced by the process for producing a lithographic printing plate according to claim 8.

10. An ink composition comprising:
a polymerizable compound;
(B) a polymerization initiator; and
(C) a colorant,
wherein the polymerizable compound consists of a radical polymerizable compound,
the radical polymerizable compound comprises one type of radical polymerizable compound (monomer (A)) selected from the group consisting of a difunctional (meth)acrylic acid ester or amide having a straight chain alkylene group of 8 to 12 carbons, and a difunctional vinyl ether having a straight chain alkylene group 8 to 12 carbons and (D) another radical polymerizable compound,
the polymerization initiator (B) consists of a radical polymerization initiator,
the other radical polymerizable compound (D) comprises a vinyl ether compound, and
the ink composition comprises a difunctional vinyl ether compound or a trifunctional vinyl ether compound as the vinyl ether compound.

11. An ink composition comprising:
a polymerizable compound;
(B) a polymerization initiator; and
(C) a colorant,
wherein the polymerizable compound consists of a radical polymerizable compound,
the radical polymerizable compound comprises one type of radical polymerizable compound (monomer (A)) selected from the group consisting of a difunctional (meth)acrylic acid ester or amide having a straight chain alkylene group of 8 to 12 carbons, and a difunctional vinyl ether having a straight chain alkylene group of 8 to 12 carbons and (D) another radical polymerizable compound,
the polymerization initiator (B) consists of a radical polymerization initiator,
the other radical polymerizable compound (D) comprises a vinyl ether compound, and
the ink composition comprises one type of compound selected from the group consisting of an ester of (meth)acrylic acid and a diol having a straight chain alkylene group of 8 to 12 carbons and an amide of (meth)acrylic acid and a diamine having a straight chain alkylene group of 8 to 12 carbons as the monomer (A), and one type of compound selected from the group consisting of a vinyl ether of a diol having a straight chain alkylene group of 8 to 12 carbons as the monomer (A).

12. An inkjet recording method comprising:
a step (a) of discharging the ink composition according to claim 10 onto a recording medium; and
a step (b) of irradiating the discharged ink composition with actinic radiation so as to cure the ink composition.

13. A process for producing a lithographic printing plate, the process comprising:
a step (a') of discharging the ink composition according to claim 10 onto a hydrophilic support; and
a step (b') of irradiating the discharged ink composition with actinic radiation so as to cure the ink composition, thus forming a hydrophobic image on the hydrophilic support by curing the ink composition.

14. A lithographic printing plate produced by the process for producing a lithographic printing plate according to claim 13.

15. An inkjet recording method comprising:
a step (a) of discharging the ink composition according to claim 11 onto a recording medium; and
a step (b) of irradiating the discharged ink composition with actinic radiation so as to cure the ink composition.

16. A process for producing a lithographic printing plate, the process comprising:
a step (a') of discharging the ink composition according to claim 11 onto a hydrophilic support; and
a step (b') of irradiating the discharged ink composition with actinic radiation so as to cure the ink composition, thus forming a hydrophobic image on the hydrophilic support by curing the ink composition.

17. A lithographic printing plate produced by the process for producing a lithographic printing plate according to claim 16.

18. The ink composition according to claim 1, wherein the ink composition of claim 1 comprises a difunctional vinyl ether compound or a trifunctional vinyl ether compound as the vinyl ether compound.

19. The ink composition according to claim 1, wherein the ink composition of claim 1 comprises one type of compound selected from the group consisting of an ester of (meth) acrylic acid and a diol having a straight chain alkylene group of 8 to 12 carbons and an amide of (meth)acrylic acid and a diamine haying a straight chain alkylene group of 8 to 12 carbons as the monomer (A), and one type of compound selected from the group consisting of a vinyl ether of a diol having a straight chain alkylene group of 8 to 12 carbons as the monomer (A).

20. The ink composition according to claim 10, therein the ink composition of claim 10 comprises one type of compound selected from the group consisting of an ester of (meth)acrylic acid and a diol having a straight chain alkylene group of 8 to 12 carbons and an amide of (meth)acrylic acid and a diamine having a straight chain alkylene group of 8 to 12 carbons as the monomer (A), and one type of compound selected from the group consisting of a vinyl ether of a diol having a straight chain alkylene group of 8 to 12 carbons as the monomer (A).

* * * * *